US012434605B2

United States Patent
Sundquist

(10) Patent No.: US 12,434,605 B2
(45) Date of Patent: Oct. 7, 2025

(54) MILITARY VEHICLE COMPRISING AN AIMING DEVICE AND AN AIMING OPERATION ARRANGEMENT FOR A VEHICLE OPERATOR

(71) Applicant: BAE Systems Hägglunds Aktiebolag, Örnsköldsvik (SE)

(72) Inventor: Rikard Sundquist, Arnäsvall (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 0 days.

(21) Appl. No.: 17/904,283

(22) PCT Filed: Jan. 28, 2021

(86) PCT No.: PCT/SE2021/050055
§ 371 (c)(1),
(2) Date: Aug. 15, 2022

(87) PCT Pub. No.: WO2021/167512
PCT Pub. Date: Aug. 26, 2021

(65) Prior Publication Data
US 2023/0112609 A1    Apr. 13, 2023

(30) Foreign Application Priority Data
Feb. 17, 2020 (SE) .................................. 2050180-5

(51) Int. Cl.
*B60N 2/24* (2006.01)
*B60N 2/885* (2018.01)
(Continued)

(52) U.S. Cl.
CPC ............... *B60N 2/24* (2013.01); *B60N 2/885* (2018.02); *B60N 2/914* (2018.02); *B60N 2/99* (2018.02);
(Continued)

(58) Field of Classification Search
CPC ........ B60N 2/99; B60N 2/986; B60N 2/2872; B60N 2/885; B60N 2/002; B60N 2/0244;
(Continued)

(56) References Cited

U.S. PATENT DOCUMENTS 2,823,393 A    2/1958  Baldine
3,179,360 A    4/1965  Shelton et al.
(Continued)

FOREIGN PATENT DOCUMENTS

GB       680262 A       10/1952
JP     2014085084 A      5/2014
(Continued)

OTHER PUBLICATIONS

Chinese Office Action and Search Report for Chinese Patent Application No. 202180014116.9 mailed on Sep. 4, 2023, 18 pages. English translation.
(Continued)

*Primary Examiner* — Syed A Islam
(74) *Attorney, Agent, or Firm* — Morrison & Foerster LLP

(57) ABSTRACT

The present invention relates to a military vehicle (V). Said military vehicle comprises an aiming device (D) and an aiming operation arrangement (A) for a vehicle operator (O) to operate the aiming device (D). Said aiming operation arrangement (A) comprises a support device (40) for providing support for the operator (O) when operating the aiming device (D). The support device (40) comprises one or more fixation devices (44A, 44B, 44C, 44D) operable between a non-fixated state and fixated state, said one or more fixation devices (44A, 44B, 44C, 44D) being configured to, in the fixated state, provide fixation of one or more body parts of the vehicle operator (O) so as to reduce influence of vehicle movement during aiming operation.

12 Claims, 4 Drawing Sheets

(51) Int. Cl.
  *B60N 2/90* (2018.01)
  *B60R 21/18* (2006.01)
  *F41G 3/22* (2006.01)
  *B60N 2/02* (2006.01)

(52) U.S. Cl.
  CPC ............. *B60R 21/18* (2013.01); *F41G 3/22* (2013.01); *B60N 2/0268* (2023.08)

(58) Field of Classification Search
  CPC .......... B60N 2/75; B60N 2/753; B60N 2/665; B60N 2/914; F41H 7/46
  See application file for complete search history.

(56) References Cited

U.S. PATENT DOCUMENTS

| | | | |
|---|---|---|---|
| 3,899,042 A | 8/1975 | Bonar | |
| 3,954,041 A * | 5/1976 | Mechulam | B60N 2/1615 89/36.13 |
| 4,766,892 A | 8/1988 | Kreitman | |
| 4,796,029 A | 1/1989 | Duppong et al. | |
| 5,330,255 A | 7/1994 | Stawicki | |
| 5,588,699 A | 12/1996 | Rundle et al. | |
| 5,819,461 A | 10/1998 | Killian | |
| 6,139,106 A * | 10/2000 | Aldridge | A61C 19/00 297/391 |
| 6,616,235 B1 * | 9/2003 | Khavari | B60N 2/885 297/410 |
| 9,884,574 B2 | 2/2018 | Mizoi et al. | |
| 10,363,852 B2 * | 7/2019 | Strumolo | B60N 2/806 |
| 11,034,269 B2 * | 6/2021 | Saigo | B60N 2/39 |
| 11,052,794 B2 * | 7/2021 | Hunsaker | B60N 2/914 |
| 2003/0223844 A1 | 12/2003 | Schiele et al. | |
| 2004/0227390 A1 | 11/2004 | Schroth | |
| 2005/0072295 A1 | 4/2005 | Sulm et al. | |
| 2009/0179469 A1 | 7/2009 | Bass | |
| 2010/0084907 A1 | 4/2010 | Greenwood et al. | |
| 2011/0018319 A1 | 1/2011 | Brown et al. | |
| 2011/0241391 A1 | 10/2011 | Lamparter et al. | |
| 2014/0319895 A1 | 10/2014 | Lange-Mao et al. | |
| 2018/0029503 A1 * | 2/2018 | Dhaini | B60N 2/66 |
| 2020/0079248 A1 * | 3/2020 | Yamamoto | B60N 2/0025 |
| 2020/0215950 A1 * | 7/2020 | Gomez | B60N 2/10 |

FOREIGN PATENT DOCUMENTS

| | | |
|---|---|---|
| KR | 20200004018 A | 1/2020 |
| WO | WO96/02402 | 2/1996 |

OTHER PUBLICATIONS

European Search Report and Opinion for European Application No. 21757412.8 mailed on Jan. 26, 2024, 8 pages.

International Search Report and Written Opinion for International Application No. PCT/SE2021/050055 mailed on Feb. 26, 2021, 15 pages.

Swedish Office Action and Search Report for Swedish Application No. SE2050180-5 mailed on Sep. 22, 2020, 8 pages.

* cited by examiner

MILITARY VEHICLE COMPRISING AN AIMING DEVICE AND AN AIMING OPERATION ARRANGEMENT FOR A VEHICLE OPERATOR

CROSS REFERENCE TO RELATED APPLICATIONS

This application is a national stage application under 35 U.S.C. § 371 of International Application No. PCT/SE2021/050055, filed internationally on Jan. 28, 2021, which claims priority to SE 2050180-5, filed Feb. 17, 2020, the entire contents of each are incorporated by reference herein.

TECHNICAL FIELD

The present invention also relates to a military vehicle comprising a weapon and an aiming operation arrangement for a vehicle operator to operate the weapon.

BACKGROUND

Certain military vehicles, such as tracked military vehicle, comprises an aiming operation arrangement for a vehicle operator to operate an aiming device, which e.g. may be for operating a weapon, a laser designator or the like. Such a military vehicle may e.g. be a vehicle with a vehicle mounted weapon system. The weapon system may comprise a weapon mounted to a turret of the vehicle, a weapon mounted on top of the vehicle not having a turret, main armament and secondary armament mounted on the top of the vehicle etc. The weapon system may further comprise an aiming operation arrangement for a vehicle operator to operate a weapon. Such an aiming operation arrangement may comprise a seat device for the operator when operating the aiming device, e.g. for operating a weapon, a laser designator or the like.

During vehicle movement in terrain, the vehicle may bump, shake and move in unexpected direction so that operators of the vehicle may be subjected to unpredictable movements. Operators/crew of the such vehicles are equipped with safety equipment such as helmets and seat belts. Such vehicle movement may affect aiming operation.

There is thus a need for providing a military vehicle facilitating aiming operation during vehicle movement.

OBJECTS OF THE INVENTION

An object of the present invention is to provide a military vehicle which facilitates aiming operation during vehicle movement.

SUMMARY

These and other objects, apparent from the following description, are achieved by a military vehicle, as set out in the appended independent claims. Preferred embodiments of the arrangement are defined in appended dependent claims.

According to the invention the objects are achieved by a military vehicle, said military vehicle comprising an aiming device and an aiming operation arrangement for a vehicle operator to operate the aiming device, said aiming operation arrangement comprising a support device for providing support for the operator when operating the aiming device, wherein the support device comprises one or more fixation devices operable between a non-fixated state and fixated state, said one or more fixation devices being configured to, in the fixated state, provide fixation of one or more body parts of the vehicle operator so as to reduce influence of vehicle movement during aiming operation.

Hereby aiming operation during vehicle movement is facilitated in that aiming operator is not affected to the same extent by vehicle movements. This further facilitates aiming operation for the vehicle operator in that such fixation of one or more body parts reduces/eliminates muscle fatigue of the vehicle operator during vehicle movement. Hereby aiming and directing of the aiming device during aiming operation may be facilitated for the vehicle operator in that the thus provided fixation provides a damping of the vehicle movements for the vehicle operator. Hereby the time the vehicle operator may operate the aiming device without the muscles of the vehicle operator being overstrained may be increased due to relief of muscles provided by said fixation.

According to an embodiment of the military vehicle, said aiming operation arrangement further comprises a sight unit for aiming operation, wherein said one or more fixation devices are configured to, in the fixated state, provide fixation of one or more body parts of the vehicle operator so as to facilitate fixation of the vehicle operator relative to the sight unit during aiming operation. Hereby aiming and directing of the aiming device during aiming operation may be further facilitated for the vehicle operator. The aiming operation arrangement may comprise a sight mirror associated with the sight unit, the sight mirror having a reticle for facilitating for the vehicle operator to direct e.g.

a weapon against a target. Said one or more fixation devices may hereby be configured to, in the fixated state, provide fixation of one or more body parts of the vehicle operator so as to facilitate directing the reticle for facilitating for the vehicle operator to direct e.g. a weapon against a target.

According to an embodiment of the military vehicle, said one or more fixation devices are configured to provide fixation of body parts of the vehicle operator comprising one or more of thighs, hip side, back, lower back, neck, head, forehead, shoulders, abs, lats, calves, chest, lateral chest, upper arms, lower arms, wrists.

According to an embodiment of the military vehicle, said support device is configured to provide fixation zones for fixation of one or more body parts of the vehicle operator so as to reduce influence of vehicle movement during aiming operation. According to an embodiment of the military vehicle, said support device is configured to provide fixation zones by means of said one or more fixation devices for fixation of one or more body parts of the vehicle operator so as to reduce influence of vehicle movement during aiming operation. According to an embodiment of the military vehicle, said support device is configured to provide different fixation zones for different body parts of the vehicle operator so as to reduce influence of vehicle movement during aiming operation. According to an embodiment of the military vehicle, said support device is configured to provide different fixation zones by means of different fixation devices of said fixation devices for fixation of body parts of the vehicle operator so as to reduce influence of vehicle movement during aiming operation. According to an embodiment of the military vehicle, said support device is configured to activate different fixation zones by means of activating fixation devices to said fixated state. According to an embodiment of the military vehicle, said support device is configured to activate different fixation zones by means of activating fixation devices to said fixated state, wherein activation of different zones may be provided simultaneously or at different times depending on situation comprising depending on body part to be fixated.

According to an embodiment of the military vehicle, said support device is configured to activate different fixation zones by means of activating fixation devices to said fixated state, wherein activation of different zones may be provided to the same degree of activation or different degree of activation depending on situation comprising depending on body part to be fixated and/or desired degree of activation from the operator.

According to an embodiment of the military vehicle, said support device comprises a seat configuration, wherein at least one of said one or more fixation devices are arranged in connection to said seat configuration comprising. According to an embodiment of the military vehicle, at least one of said one or more fixation devices are comprised in said seat configuration. According to an embodiment of the military vehicle, at least one of said one or more fixation devices are integrated with said seat configuration. By thus having a seat configuration with one or more fixation devices are arranged in connection to said seat configuration and/or integrated in said seat configuration, fixation of the vehicle operator is facilitated.

According to an embodiment of the military vehicle, at least one of said one or more fixation devices is an expandable fixation device operable between a non-expanded state and an expanded state, said one or more expandable fixation devices being configured to, in the expanded state, provide fixation of one or more body parts of the vehicle operator. According to an embodiment of the military vehicle, at least one of said one or more fixation devices is an expandable fixation device operable between a non-expanded state and different expanded states, said different expanded states being configured to provide different degree of expansion so as to facilitate providing different degree of fixation of one or more body parts of the vehicle operator. By thus having at least one of said one or more fixation devices being an expandable fixation device, the degree of fixation may be efficiently controlled so that the fixation may easily be adapted to size of the vehicle operator and to desired degree of fixation for the vehicle operator.

According to an embodiment of the military vehicle, at least one of said one or more fixation devices is adjustable so as to adapt the fixation to the size of the vehicle operator positioned in the support device. By thus having at least one of said one or more fixation devices being adjustable, the degree of fixation may be efficiently controlled so that the fixation may easily be adapted to size of the vehicle operator and to desired degree of fixation for the vehicle operator.

According to an embodiment of the military vehicle, at least one of said one or more fixation devices is inflatable. According to an embodiment of the military vehicle, at least one of said one or more fixation devices is an inflatable fixation device operable between a non-inflated state and an inflated state, said one or more inflatable fixation devices being configured to, in the inflated state, provide fixation of one or more body parts of the vehicle operator. According to an embodiment of the military vehicle, at least one of said one or more fixation devices is an inflatable fixation device operable between a non-inflated state and different inflated states, said different inflated states being configured to provide different degree of inflation so as to facilitate providing different degree of fixation of one or more body parts of the vehicle operator. By thus having at least one of said one or more fixation devices being an inflatable fixation device, operation of fixation devices may be facilitated. By thus having at least one of said one or more fixation devices being an inflatable fixation device, a suitable degree of damping in the fixated and thus inflated state may be efficiently obtained. By thus having at least one of said one or more fixation devices being an inflatable fixation device, the degree of fixation may be efficiently controlled so that the fixation may easily be adapted to size of the vehicle operator and to desired degree of fixation for the vehicle operator. By thus having at least one of said one or more fixation devices being an inflatable fixation device, adjustability so as to adapt the fixation to the size of the vehicle operator positioned in the support device is facilitated. According to an embodiment of the military vehicle, one or more of said one or more inflatable devices is adjustable.

According to an embodiment of the military vehicle, at least one of said one or more fixation devices are configured to, in the fixated state, provide pressure against one or more body parts of the vehicle operator so as to achieve said fixation. Hereby efficient fixation may be obtained.

According to an embodiment of the military vehicle, the support device comprises an activation unit for activating said one or more fixation devices to said fixated state. The support device may comprise more than one activation unit. According to an embodiment of the military vehicle, the support device comprises at least one activation unit for activating said one or more fixation devices to said fixated state. According to an embodiment of the military vehicle, the support device comprises an activation unit comprising one or more activation members for activating said one or more fixation devices to said fixated state. According to an embodiment of the military vehicle, the support device comprises an activation unit comprising an activation member for each of said one or more activation devices for activating said one or more fixation devices to said fixated state. According to an embodiment of the military vehicle, the support device comprises an activation unit for activating said one or more fixation devices to said fixated state, wherein said activation unit may be configured to activate said one or more fixation devices to different degree of fixated state. According to an embodiment of the military vehicle, the support device comprises an activation unit for activating said one or more fixation devices to said fixated state, wherein said activation unit may be configured to activate said one or more fixation devices at different points of time so as to facilitate operation for the operator. By thus providing an activation unit, operation of the fixation devices is facilitated. According to an aspect of the present disclosure, said activation unit may be configured to both activate said one or more fixation devices to said fixated state and deactivate said one or more fixation devices from said fixated state to said non-fixated state.

According to an embodiment of the military vehicle, said activation unit comprises a manually operable manoeuvring device. By thus providing an activation unit with a manually operable manoeuvring device, operation of the fixation devices is facilitated in that the vehicle operator may manually control the fixation during aiming operation.

According to an embodiment of the military vehicle, said activation unit is configured to activate one or more fixation devices by providing a fluid for inflating the one or more fixation devices. Hereby operation of fixation devices may be facilitated. Hereby inflation of fixation devices may be facilitated. Hereby operation of fixation devices so as to control the degree of inflation and hence degree of fixation may be facilitated.

According to an embodiment of the military vehicle, the support device comprises an emergency deactivation unit for deactivating said one or more fixation devices to said non-fixated state. Hereby safety of operation of fixation devices is increased. Hereby a vehicle operator may efficiently deactivate fixation device.

According to an aspect of the present disclosure, said emergency deactivation unit for deactivating said one or more fixation devices to said non-fixated state is operably connected to said activation unit.

According to an embodiment of the military vehicle, the support device comprises a control device for controlling fixation of said one or more fixation devices. By thus having a control device for adjusting the fixation of said one or more fixation devices, the degree of fixation may be efficiently controlled so that the fixation may easily be adapted to size of the vehicle operator and to desired degree of fixation for the vehicle operator. According to an embodiment of the military vehicle, the control device may be configured to control the fixation of said one or more fixation devices based on size of the vehicle operator and/or vehicle vibration during vehicle movement and/or desired degree of fixation and/or provided pressure by means of said one or more fixation devices. According to an embodiment of the military vehicle, the support device comprises a control device for controlling fixation of said one or more fixation devices based on sensor data from one or more sensors arranged in connection to said support device. According to an embodiment of the military vehicle, the support device comprises a control device for controlling fixation of said one or more fixation devices based on sensor data from one or more sensors, comprising sensor data about size of the vehicle operator/body parts of the vehicle operator and/or sensor data about vehicle vibration during vehicle movement and/or sensor data about provided pressure against one or more body parts by means of said one or more fixation devices. According to an embodiment of the military vehicle, the control device, when controlling the fixation, may be configured to adjust the fixation of said one or more fixation devices based on size of the vehicle operator and/or vehicle vibration during vehicle movement and/or desired degree of fixation and/or provided pressure by means of said one or more fixation devices. According to an embodiment of the military vehicle, the control device, when controlling the fixation, may be configured to control the degree of inflation of said one or more fixation devices based on size of the vehicle operator and/or vehicle vibration during vehicle movement and/or desired degree of fixation.

BRIEF DESCRIPTION OF THE DRAWINGS

For a better understanding of the present disclosure reference is made to the following detailed description when read in conjunction with the accompanying drawings, wherein like reference characters refer to like parts throughout the several views, and in which.

DETAILED DESCRIPTION

Figure 1A:
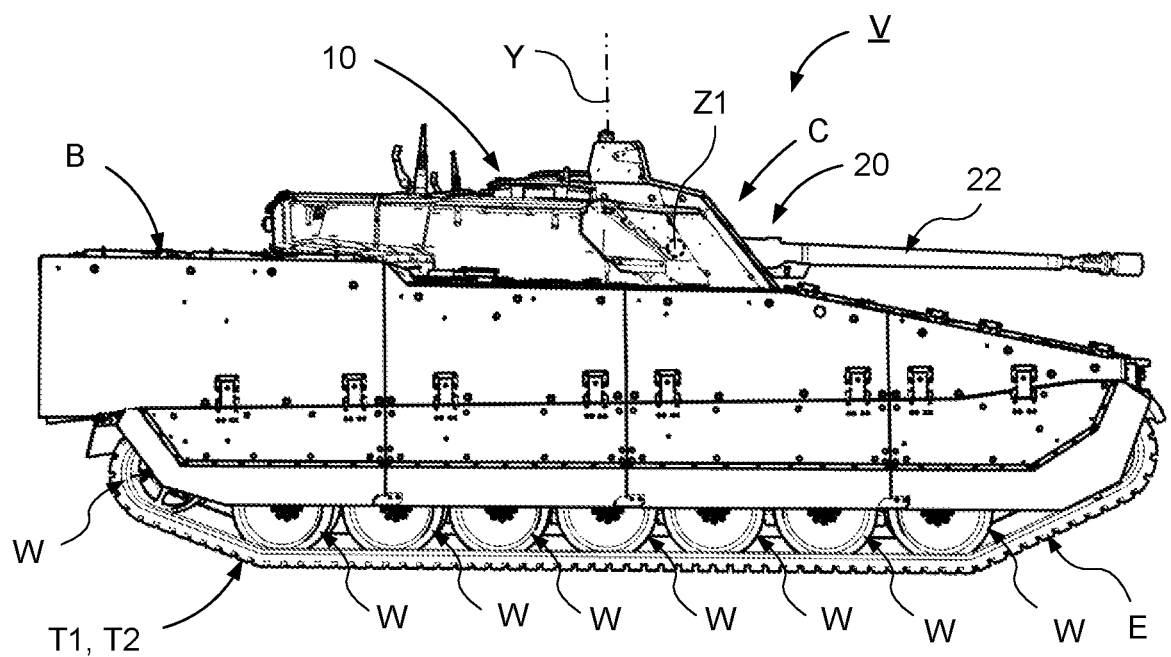
FIG. 1a schematically illustrates a side view of a tracked military vehicle according to an embodiment of the present disclosure.

Herein the term "link" refers to a communication link which may be a physical connector, such as an optoelectronic communication wire, or a non-physical connector such as a wireless connection, for example a radio or microwave link.

Herein the term "vehicle operator" may refer to any operator of a military vehicle providing operation associated with an aiming operation arrangement. The term "vehicle operator" may comprise an operator operating a camera of the vehicle, a sight unit of the vehicle, a weapon of the vehicle, a surveillance operator, an operator operating a radar of the vehicle, an operator operating a remote weapon station (RWS), an operator operating a periscope of the vehicle, an observer or the like.

Herein the term "aiming operation arrangement" may be any operation arrangement of a military vehicle associated with an aiming operation, and may be associated with one or more of camera operation, sight operation, weapon operation, surveillance operation, radar operation, operation of remote weapon station (RWS), periscope operation, observation or the like.

Herein the term "aiming device" may comprise and/or be associated with one or more of camera for camera operation, sight unit for sight operation, weapon for weapon operation, surveillance unit for surveillance operation, radar for radar operation, RWS-unit for operation of remote weapon station (RWS), periscope for periscope operation, observation device for observation or the like.

The military vehicle according to the present disclosure may be any suitable military vehicle. The military vehicle according to the present disclosure may be a tracked vehicle or a wheeled vehicle.

The military vehicle according to the present disclosure may be any suitable vehicle comprising an aiming operation arrangement for a vehicle operator to operate an aiming device. Such an aiming device may be provided for any suitable aiming operation of the vehicle operator. Such an aiming device may be an aiming device for facilitating operating a weapon, a laser designator or the like.

The military vehicle according to the present disclosure may e.g. be a vehicle with a vehicle mounted weapon system comprising an aiming operation arrangement. The weapon system may comprise one or more weapons being associated with the aiming operation arrangement so that operation of the weapon is facilitated for a vehicle operator. The weapon system may comprise a weapon mounted to a turret of the vehicle. For a weapon system comprising a weapon mounted to a turret of the vehicle, the weapon and associated aiming device may be configured to be operated by means of a vehicle operator positioned within the turret, e.g. as exemplified below with reference to FIG. 1-4. For a weapon system comprising a weapon mounted to a turret of the vehicle, a vehicle operator associated with an aiming operation arrangement of the vehicle may be positioned in a driver seat. For a weapon system comprising a weapon mounted to a turret of the vehicle, a vehicle operator associated with an aiming operation arrangement of the vehicle may be positioned in a war room of the vehicle. The weapon system may comprise one or more weapons mounted to a military vehicle not having a turret. The weapon system may comprise one or more weapons mounted on top of a military vehicle not having a turret. The weapon system may comprise main armament and secondary armament mounted to the vehicle. The weapon system may comprise weapon coaxially mounted to the military vehicle. The weapon system may comprise a weapon station. The weapon system may comprise a robot/missile system. The weapon system may comprise a remotely controlled weapon. The weapon system may comprise a control device for remotely controlling a weapon. The weapon system may comprise a laser target designation (LTD) arrangement.

The military vehicle according to the present disclosure may be a vehicle with a vehicle mounted aiming operation arrangement comprising one or more laser pointers and/or spotlight device, and/or smoke grenades or the like.

The aiming operation arrangement according to the present disclosure thus comprises an aiming device for aiming operation of a vehicle operator positioned at the vehicle. The aiming device according to the present disclosure comprises a sight unit for the vehicle operator.

The aiming device according to the present disclosure comprises or is operably connected to an actuator unit, e.g. a control handle, for manoeuvring the aiming device. The actuator unit may according to an aspect of the present disclosure be controlled by electronics and software, e.g. by means of an electronic control unit, so as to facilitate for the operator to operate the aiming device.

The aiming operation arrangement may further comprise a sight unit for aiming operation, i.e. for facilitating the view and hence sight for the vehicle operator when aiming at a target. The aiming device may comprise said sight unit.

The aiming device according to the present disclosure may comprise a sight mirror having a reticle for facilitating for the vehicle operator to direct e.g. a weapon against a target. The sight mirror is associated with the sight unit. The sight unit may according to an aspect of the present disclosure comprise the sight mirror. According to an aspect of the present disclosure the actuator unit, e.g. control handle, is operably connected to the sight mirror, wherein the sight mirror is configured to receive input from the actuator unit, e.g. control handle, so as to direct the reticle according to the aiming operation performed by the vehicle operator.

The aiming device according to the present disclosure may comprise one or more aiming motors. The aiming device according to the present disclosure may comprise an elevation for controlling elevation movement, e.g. of a weapon, and an aiming motor for side motion comprising rotational side movement, e.g. of a weapon. The one or more aiming motors are operably connected to the sight mirror. The one or more aiming motors are controlled by means of one or more control units, e.g. by means of a so called fire control computer (FCC).

The aiming operation arrangement according to the present disclosure comprises a support device for providing support for the operator when operating the aiming device. The support device may comprise a seat configuration for the operator to be in a sitting position when performing aiming operation. Such a seat configuration may be fixedly attached to the floor, e.g. floor of a turret. Such a seat configuration may be fixedly and/or suspendedly attached to a wall. Such a seat configuration may be fixedly and/or suspendedly attached to a sealing. The support device may comprise a standing configuration for the operator to be in a standing/hanging position when performing aiming operation. Such a standing configuration may be fixedly attached to the floor, e.g. floor of a turret. Such a seat configuration may be fixedly and/or suspendedly attached to a wall. Such a seat configuration may be fixedly and/or suspendedly attached to a sealing. Such a standing configuration may be a vest or the like suspendedly connected to a sealing of the vehicle.

The support device according to the present disclosure comprises one or more fixation devices operable between a non-fixated state and fixated state, said one or more fixation devices being configured to, in the fixated state, provide fixation of one or more body parts of the vehicle operator so as to reduce influence of vehicle movement during aiming operation. According to an aspect of the present disclosure, the support device according to the present disclosure comprises one or more fixation devices operable between a non-fixated state and fixated states with different degree of fixation, said one or more fixation devices being configured to, in a fixated state, provide a certain degree of fixation of one or more body parts of the vehicle operator so as to reduce influence of vehicle movement during aiming operation. According to an aspect of the present disclosure, the support device according to the present disclosure comprises one or more fixation devices operable between a non-fixated state and different fixated states with different degree of fixation, said one or more fixation devices being configured to, in a fixated state, provide a certain degree of fixation of one or more body parts of the vehicle operator, said degree of fixation depending on one or more of size of vehicle operator/body part of vehicle operator, vibration during vehicle movement, desired degree of fixation, type of aiming operation, so as to reduce influence of vehicle movement during aiming operation and thus facilitate aiming.

The support device according to the present disclosure the aiming operation arrangement comprises a sight unit for facilitating aiming operation. Said one or more fixation devices of the support device are configured to, in the fixated state, provide fixation of one or more body parts of the vehicle operator so as to facilitate fixation of the vehicle operator relative to the sight unit during aiming operation.

According to an embodiment of the military vehicle, said one or more fixation devices are configured to provide fixation of one or more body parts of the vehicle operator. Said one or more body parts may comprise one or more of thighs, hip side, back, lower back, neck, head, forehead, shoulders, abs, lats, calves, chest, lateral chest, upper arms, lower arms, wrists. These are examples. The one or more body parts configured to be fixated by means of said one or more fixation devices may depend on type of aiming operation. For example, different fixation devices configured to provide fixation on different body parts of the vehicle operator may be activated depending on type of aiming operation. The one or more body parts configured to be fixated by means of said one or more fixation devices may depend on configuration of support device, e.g. whether the support device comprises a seat configuration in which the vehicle operator is intended to sit, or a standing configuration in which the vehicle operator is intended to stand, such a vest configuration, harness configuration or the like.

Figure 1B:
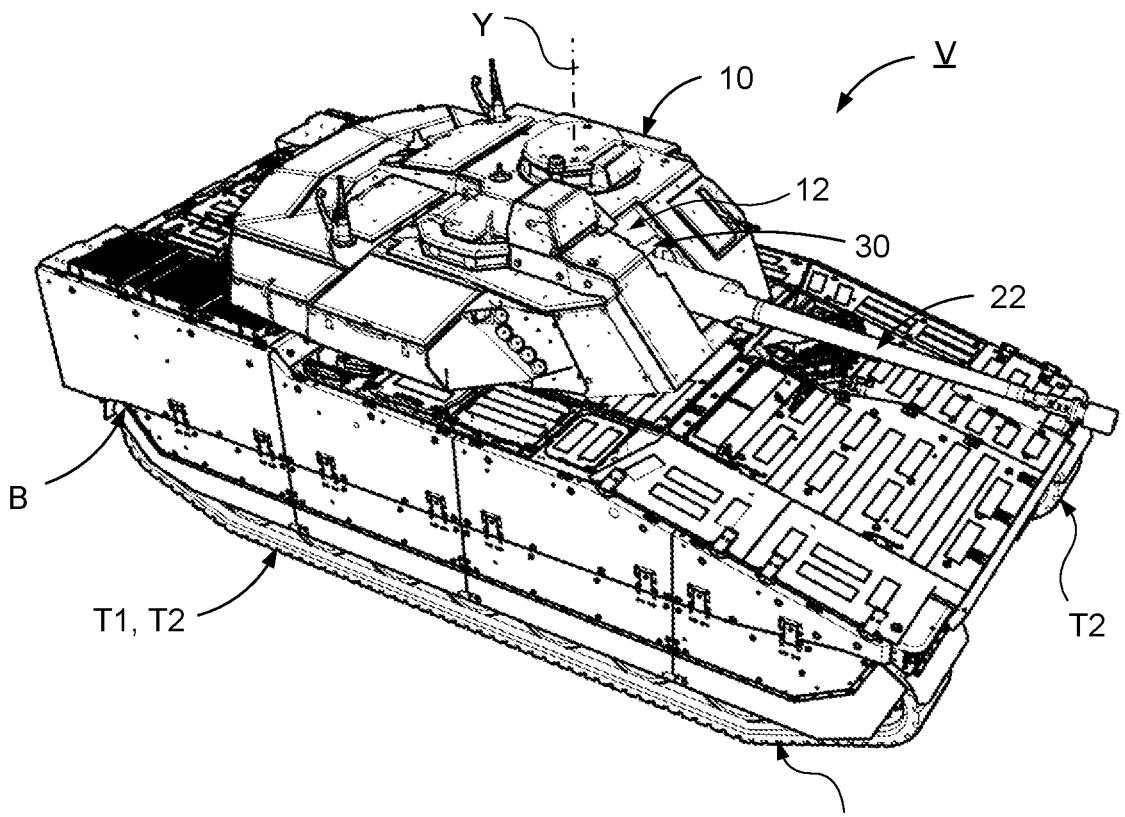
FIG. 1b schematically illustrates a perspective view of the tracked military vehicle in FIG. 1a according to an embodiment of the present disclosure.

FIG. 1a schematically illustrates a side view of a tracked military vehicle V according to an aspect of the present disclosure and FIG. 1b schematically illustrates a perspective view of the vehicle V in FIG. 1a. The exemplified vehicle 1 is constituted by a combat vehicle. The tracked vehicle V comprises a vehicle body B, which according to an aspect of the present disclosure comprises the chassis of the vehicle V and bodywork. The military vehicle V according to FIG. 1a-b is an example of a tracked military vehicle according to the present disclosure. The military vehicle according to the present disclosure may, as mentioned above be any suitable wheeled or tracked military vehicle having aiming operation arrangement.

The tracked vehicle V comprises a track assembly pair T1, T2 being suspendedly connected to the vehicle body B. The track assembly pair comprises a right track assembly T1 and a left track assembly T2 for driving the vehicle, each track assembly comprising a drive means driven endless track E arranged to run over a set of wheels W of the track assembly.

Even if the military vehicle illustrated in FIG. 1*a-b* is a tracked vehicle the vehicle may according to other embodiments of the present disclosure be constituted by a wheeled vehicle.

The vehicle V is equipped with a turret 10. The turret 10 is arranged on top of the vehicle V. The turret 10 is rotatable about a rotation axis Y orthogonal to the longitudinal extension of the vehicle V and orthogonal to the transversal extension of the vehicle V. The military vehicle according to the present disclosure may, as mentioned above, be a military vehicle without a turret.

The vehicle V is configured to be equipped with a weapon system C having a weapon 20 with a gun barrel 22. The gun barrel 22 of the weapon 20 is mounted to the turret 10. The gun barrel 22 of the weapon system C is thus allowed to rotate by means of rotating the turret 10 about the axis Y.

The gun barrel 22 of the weapon 20 is configured to be connected to an elevation device 30 such as weapon cradle connected to the turret 10. The gun barrel 22 is configured to be raised and lowered, i.e. provide an elevation movement, about an elevation axis Z1, illustrated in FIG. 1*a*, by means of the elevation device, e.g. weapon cradle.

The weapon cradle 30 is configured to be connected to a bearing support member 12 of the turret 10 so as to facilitate said elevation movement by means of the weapon cradle 30. The bearing support member 12 may be bearing support member 12 illustrated in FIGS. 3, 4*a-b* and 5*a-b*.

The weapon system C said of the military vehicle comprises an aiming operation arrangement for a vehicle operator to operate an aiming device so as to facilitate operating the weapon 20, i.e. facilitate aiming the weapon at a target. An example of an aiming operation arrangement according to the present disclosure is described below with reference to FIG. 2.

Figure 2:
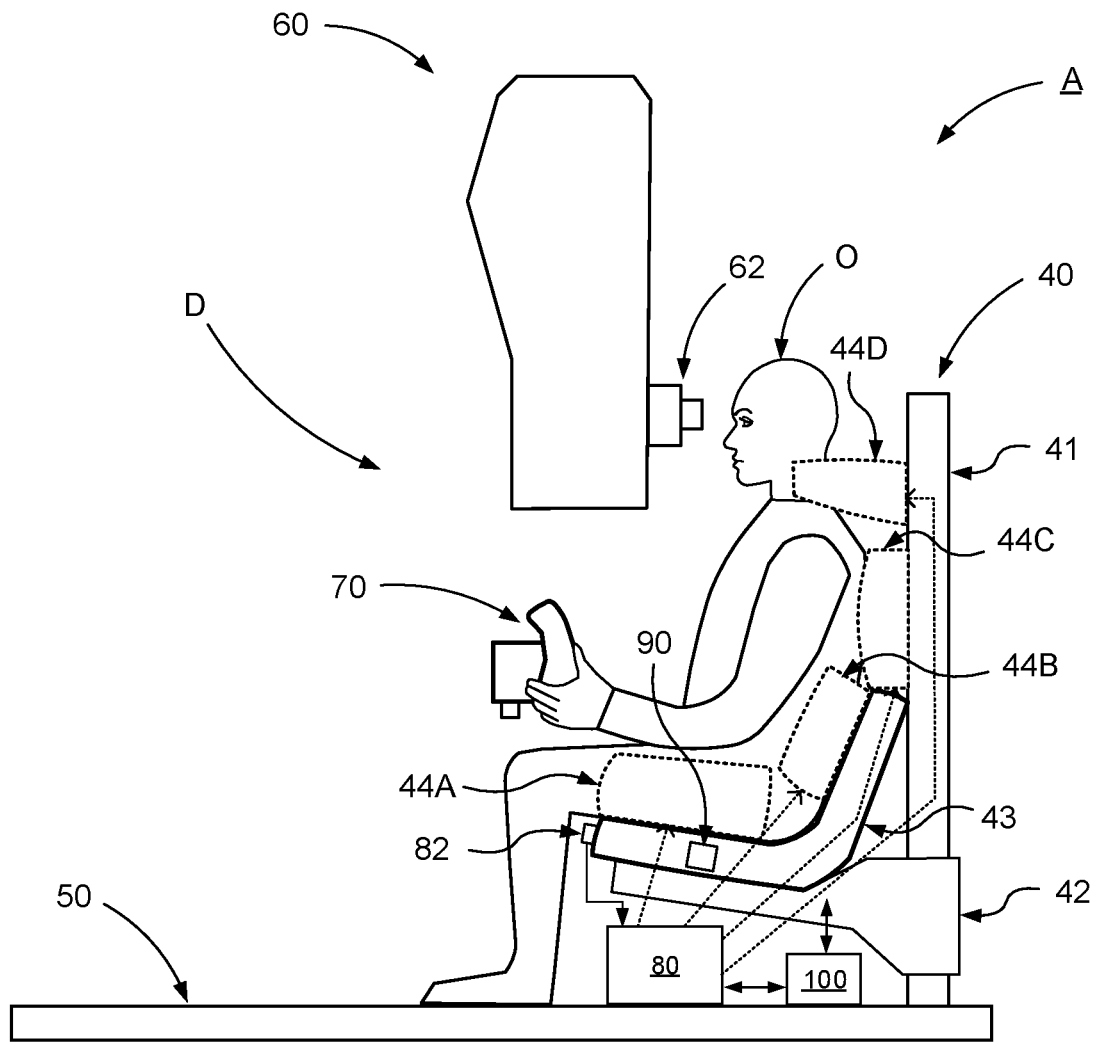
FIG. 2 schematically illustrates a side view of an aiming operation arrangement according to an embodiment of the present disclosure.
Figure 3:
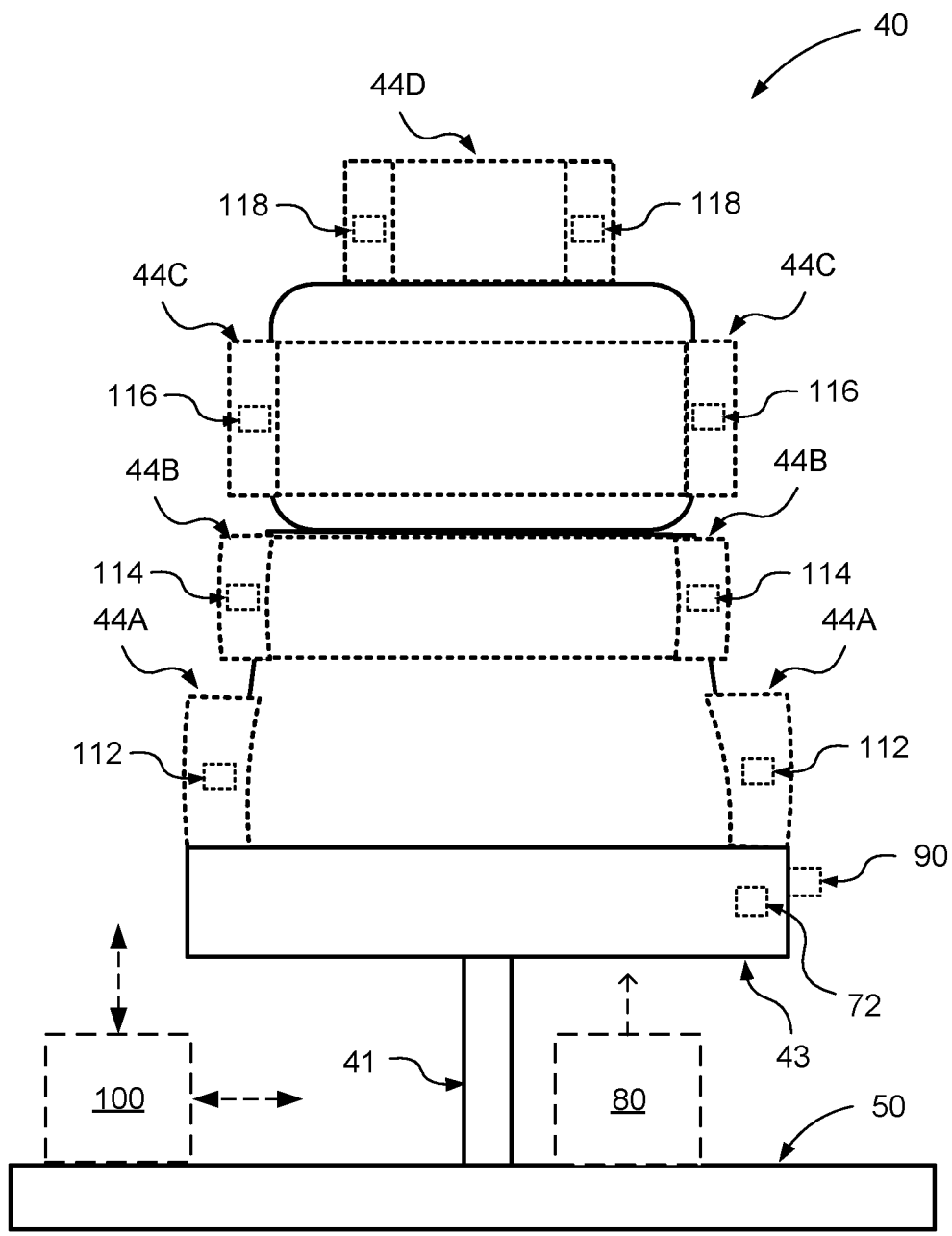
FIG. 3 schematically illustrates a front view of a support device of an aiming operation arrangement according to an embodiment of the present disclosure; and, FIG. 4 schematically illustrates a front view of a system for controlling adjustment of one or more fixation device of a support device of an aiming operation arrangement according to an embodiment of the present disclosure.

FIG. 2 schematically illustrates a side view of an aiming operation arrangement A according to an embodiment of the present disclosure, and FIG. 3 schematically illustrates a front view of a support device of an aiming operation arrangement A according to an embodiment of the present disclosure. The aiming operation arrangement A comprises an aiming device D.

The aiming operation arrangement A is intended for a vehicle operator O to operate the aiming device D. The aiming operation arrangement A is according to an aspect of the present disclosure associated with the weapon system of the military vehicle. The aiming operation arrangement A is according to an aspect of the present disclosure associated with a vehicle mounted weapon and/or laser designator or the like.

The aiming operation arrangement A is according to an aspect of the present disclosure associated with a turret of a military vehicle provided with a turret, e.g. a turret as described with reference to FIG. 1*a-b*. The aiming operation arrangement A is according to an aspect of the present disclosure, for a vehicle provided with a turret, arranged in connection to the turret of the military vehicle, e.g. a turret as described with reference to FIG. 1*a-b*. The aiming operation arrangement A is according to an aspect of the present disclosure, for a vehicle provided with a turret, arranged within the turret of the military vehicle, e.g. a turret as described with reference to FIG. 1*a-b*.

Said aiming operation arrangement A comprises a support device 40 for providing support for the operator O when operating the aiming device.

According to an aspect of the present disclosure, the support device 40 comprises a vertical support member 41. According to an aspect of the present disclosure, the support device 40 comprises an adjustment member 42 movably connected to the vertical support member for facilitating vertical movement along the support member 41.

According to an aspect of the present disclosure, the support device 40 comprises a seat configuration 43 configured to provide seat support for the vehicle operator. The seat configuration 43 is connected to the adjustment member 42. The seat configuration 43 is configured to be supported by the adjustment member 42. The adjustment member 42 is configured to support the seat configuration 43. The adjustment member 42 is configured to provide vertical adjustment of the seat configuration 43 so as to adapt the level of the seat configuration 43 for the vehicle operator O.

The support device 40 in FIGS. 2 and 3, with a vertical support member 41, adjustment member 42 and seat configuration 43 is only an example of how a support device may be configured for facilitating supporting an operator and for mounting the support device. As mentioned above, the support device may comprise a seat configuration for the operator to be in a sitting position when performing aiming operation, which seat configuration, as exemplified in FIG. 2, may be fixedly attached to the floor, e.g. floor of a turret, or fixedly and/or suspendedly attached to a wall, or fixedly and/or suspendedly attached to a sealing. As mentioned above, the support device may comprise a standing configuration for the operator to be in a standing/hanging position when performing aiming operation. Such a standing configuration may be fixedly attached to the floor, e.g. floor of a turret, or fixedly and/or suspendedly attached to a wall, or fixedly and/or suspendedly attached to a sealing of the vehicle. Such a standing configuration may comprise a vest configuration, harness configuration or the like suspendedly connected to a sealing of the vehicle.

According to an alternative aspect of the present disclosure the support device may thus comprise any other suitable kind of support arrangement than a seat configuration, for supporting the vehicle operator, which may be mounted in any suitable way. Such a support arrangement may comprise a vest configuration for supporting the vehicle operator, a harness configuration for supporting the vehicle operator, or the like.

According to an aspect of the present disclosure, the support device 40 is connected to a floor portion 50. According to an aspect of the present disclosure the floor portion 50 is connected to a turret. The floor portion 50 is according to an aspect comprised in a turret. The floor portion 50 is according to an aspect configured to be rotated with a turret. The vertical support member 41 of the support device 40 is according to an aspect fixedly connected to the floor portion 50.

Said aiming operation arrangement A thus comprises a sight unit configuration 60. Said aiming device D of the aiming operation arrangement A comprises the sight unit configuration 60. The sight unit configuration 60 comprises a sight unit 62. The aiming operation arrangement A thus comprises a sight unit 62 for aiming operation, i.e. for facilitating the view and hence sight for the vehicle operator O when aiming at a target.

The sight unit configuration 60 is according to this example configured to support the sight unit 62. The sight unit configuration 60 is configured to facilitate viewing the surrounding from the turret in the direction of the aiming device, e.g. for direction of the gun barrel of a weapon. Said aiming operation arrangement A thus comprises a sight unit 62 for aiming operation. The sight unit 62 is provided for facilitating aiming for the vehicle operator O. Said sight unit configuration 60 and or the sight unit may be adjustable relative to the support device 40, and hence relative to the vehicle operator O, so as to optimize the view for the vehicle operator O.

Said aiming operation arrangement A thus comprises an actuator unit 70 for manoeuvring, i.e. controlling, the aiming device, see FIG. 2. The actuator unit 70 may comprise/be comprised of a control handle. The actuator unit 70 is connected to the aiming device, not shown in FIG. 2, is arranged in connection to the support device 40 so that the vehicle operator O may easily grip the actuator unit 70. The position of the actuator unit 70 may be adjusted. The actuator unit 70 may be adjustable relative to the support device.

The aiming device D according to the present disclosure comprises or is operably connected to the actuator unit 70, e.g. a control handle, for manoeuvring the aiming device D. The actuator unit 70 may according to an aspect of the present disclosure be controlled by electronics and software, e.g. by means of an electronic control unit, not shown, so as to facilitate for the operator to operate the aiming device D.

The aiming device D according to the present disclosure may comprise a sight mirror having a reticle for facilitating for the vehicle operator to direct a weapon, a laser designator or the like, against a target. The sight mirror is associated with the sight unit 62. The sight unit 62 may according to an aspect of the present disclosure comprise the sight mirror. According to an aspect of the present disclosure the actuator unit 70, e.g. control handle, is operably connected to the sight mirror, wherein the sight mirror is configured to receive input from the actuator unit 70, e.g. control handle, so as to direct the reticle according to the aiming operation performed by the vehicle operator O.

The aiming device D according to the present disclosure may comprise one or more aiming motors, not shown. The aiming device D according to the present disclosure may comprise an elevation for controlling elevation movement, e.g. of a weapon, and an aiming motor for side motion comprising rotational side movement, e.g. of a weapon. The one or more aiming motors may be operably connected to the sight mirror. The one or more aiming motors are controlled by means of one or more control units, e.g. by means of a so called fire control computer (FCC).

The support device 40 comprises one or more fixation devices 44A, 44B, 44C, 44D operable between a non-fixated state and fixated state.

Said one or more fixation devices 44A, 44B, 44C, 44D are configured to, in the fixated state, provide fixation of one or more body parts of the vehicle operator so as to reduce influence of vehicle movement during aiming operation.

Said one or more fixation devices 44A, 44B, 44C, 44D are configured to, in the fixated state, provide fixation of one or more body parts of the vehicle operator so as to facilitate fixation of the vehicle operator relative to the sight unit during aiming operation.

Said one or more fixation devices are configured to provide fixation of one or more body parts of the vehicle operator. Said one or more body parts may comprise one or more of thighs, hip side, back, lower back, neck or neck, head, head, shoulders, abs, lats, calves, chest, lateral chest, upper arms, lower arms, wrists.

According to an aspect of the present disclosure the support device 40 comprises a thigh fixation device 44A configured to provide fixation of the thighs of the vehicle operator O. The thigh fixation device 44A comprises a left thigh fixation device 44A arranged in connection to the left thigh and right thigh fixation device 44A arranged in connection to the right thigh of the vehicle operator, when the vehicle operator is positioned in the seat configuration 43 of the support device 40.

According to an aspect of the present disclosure the support device 40 comprises a lower back fixation device 44B configured to provide fixation of the lower back of the vehicle operator O. The lower back fixation device 44B comprises a left lower back fixation device 44B arranged in connection to the left side of the lower back and right lower back fixation device 44B arranged in connection to the right side lower back of the vehicle operator, when the vehicle operator is positioned in the seat configuration 43 of the support device 40.

According to an aspect of the present disclosure the support device 40 comprises a back fixation device 44C configured to provide fixation of the back of the vehicle operator O. The back fixation device 44C comprises a left back fixation device 44C arranged in connection to the left side of the back and right back fixation device 44C arranged in connection to the right side back of the vehicle operator, when the vehicle operator is positioned in the seat configuration 43 of the support device 40.

According to an aspect of the present disclosure the support device 40 comprises a neck fixation device 44D configured to provide fixation of the neck of the vehicle operator O. The neck fixation device 44D comprises a left neck fixation device 44D arranged in connection to the left side of the neck and right neck fixation device 44D arranged in connection to the right side neck of the vehicle operator, when the vehicle operator is positioned in the seat configuration 43 of the support device 40.

These are examples and there may be fewer fixation devices or more fixation devices arranged to provide fixation or fixation devices arranged differently, e.g. in connection to other body parts and/or arranged differently relative to certain body parts. For example, the one or more fixation devices may comprise a fixation device, e.g. a cushion configuration or the like, arranged between the legs of the operator in connection to the knees of the operator, configured to prevent the knees of the operator to be connectingly pressed against each other by means of the left and right thigh fixation device 44A. According to an aspect of the present disclosure the support device 40 may comprise a thigh separation member, not shown, configured to be arranged between said right and left thighs so as to prevent said thighs being pressed against each other when subjected to said left and right thigh fixation devices 44A.

According to an aspect of the present disclosure, at least one of said one or more fixation devices 44A, 44B, 44C, 44D are arranged in connection to said seat configuration 43. According to an aspect of the present disclosure, at least one of said one or more fixation devices 44A, 44B, 44C, 44D are comprised in said seat configuration 43. According to an aspect of the present disclosure, at least one of said one or more fixation devices 44A, 44B, 44C, 44D are integrated with seat configuration.

According to an aspect of the present disclosure, at least one of said one or more fixation devices 44A, 44B, 44C, 44D may be arranged in connection to said support member 41.

According to an aspect of the present disclosure, at least one of said one or more fixation devices 44A, 44B, 44C, 44D is an expandable fixation device operable between a non-expanded state and an expanded state. According to an aspect of the present disclosure, said one or more expandable fixation devices is configured to, in the expanded state, provide fixation of one or more body parts of the vehicle operator O.

According to an aspect of the present disclosure, at least one of said one or more fixation devices 44A, 44B, 44C, 44D is adjustable so as to adapt the fixation to the size of the vehicle operator O positioned in the support device.

Adjustment may be performed base on sensor information.

According to an aspect of the present disclosure, at least one of said one or more fixation devices 44A, 44B, 44C, 44D is inflatable.

According to an aspect of the present disclosure, at least one of said one or more fixation devices 44A, 44B, 44C, 44D are configured to, in the fixated state, provide pressure against one or more body parts of the vehicle operator O so as to achieve said fixation.

According to an aspect of the present disclosure, the support device 40 comprises an activation unit 80 for activating said one or more fixation devices 44A, 44B, 44C, 44D to said fixated state. Said activation unit 80 may also be denoted activation device 80. The support device 40 may comprise more than one activation unit. Said activation unit 80 may comprise one or more activation members for activating said one or more fixation devices 44A, 44B, 44C, 44D to said fixated state. Said activation unit 80 may comprise an activation member for each of said one or more fixation devices 44A, 44B, 44C, 44D for activating said one or more fixation devices 44A, 44B, 44C, 44D to said fixated state.

According to an aspect of the present disclosure, said activation unit 80 is manually operable for providing manual activation of said one or more fixation devices 44A, 44B, 44C, 44D to said fixated state. According to an aspect of the present disclosure, said activation unit 80 may be configured to automatically activate said one or more fixation devices 44A, 44B, 44C, 44D to said fixated state. Said automatic activation by means of the activation unit 80 may e.g. be based on information related to the vehicle operator being ready for aiming operation, e.g. by being positioned in the seat configuration 43.

According to an aspect of the present disclosure, said activation unit 80 may comprise a manually operable manoeuvring device 82. The manually operable manoeuvring device 82 may be any suitable manoeuvring device such as a button, switch, pump device or the like. The manually operable manoeuvring device 82 may be manually operable so as to control and adjust the fixation provided by the one or more fixation devices. The manually operable manoeuvring device 82 may be manually operable so as to activate the activation unit 80, wherein fixation provided by the one or more fixation devices is provided automatically. The manually operable manoeuvring device 82 may be arranged in any suitable location in connection to the vehicle operator when positioned for operation so that the vehicle operator O may easily operate the manoeuvring device 82.

According to an aspect of the present disclosure, said activation unit 80 is configured to activate one or more fixation devices 44A, 44B, 44C, 44D by providing a fluid for inflating the one or more fixation devices. The fluid may be any suitable fluid such as a gas, e.g. air, a liquid a gel or the like.

According to an aspect of the present disclosure, the support device 40 comprises an emergency deactivation unit 90 for deactivating said one or more fixation devices 44A, 44B, 44C, 44D to said non-fixated state. The emergency deactivation unit 90 may be any suitable emergency deactivation unit such as a button, switch, pulling unit or the like.

According to an aspect of the present disclosure, the support device 40 comprises a control device 100 for controlling fixation of said one or more fixation devices 44A, 44B, 44C, 44D. According to an aspect of the present disclosure, the control device 100 may be configured to adjust the fixation of one or more fixation devices.

According to an embodiment of the military vehicle, the control device 100 may be configured to control fixation of said one or more fixation devices based on size of the vehicle operator and/or vehicle vibration during vehicle movement and/or desired degree of fixation, and/or provided pressure against one or more body parts by means of said one or more fixation devices.

According to an aspect of the present disclosure, the control device 100 may be configured to control fixation of said one or more fixation devices based on size of the vehicle operator, wherein the control may comprise adjustment. According to an aspect of the present disclosure, the control device 100 may be configured to control fixation of said one or more fixation devices based on vehicle vibration during vehicle movement, wherein the control may comprise adjustment. According to an aspect of the present disclosure, the control device 100 may be configured to control fixation of said one or more fixation devices based on desired degree of fixation, wherein the control may comprise adjustment. According to an aspect of the present disclosure, the control device 100 may be configured to control fixation of said one or more fixation devices based on provided pressure against one or more body parts by means of said one or more fixation devices.

According to an embodiment of the military vehicle, the control device 100 may be configured to control fixation of said one or more fixation devices based on sensor data from one or more sensors.

According to an embodiment of the military vehicle, the control device 100 may be configured to control fixation of said one or more fixation devices based on sensor data from one or more sensors, said one or more sensors comprising one or more sensors configured to provide sensor data about size of the vehicle operator and/or one or more sensors configured to provide sensor data about vehicle vibration during vehicle movement and/or provided pressure against one or more body parts by means of said one or more fixation devices.

Said one or more sensors configured to provide sensor data for providing basis for controlling the one or more fixation devices may comprise any suitable sensors.

Said one or more sensors configured to provide sensor data for providing basis for controlling the one or more fixation devices may comprise one or more cameras configured to detect the vehicle operator, position of aiming operator relative said one or more fixation devices, identify the vehicle operator or the like.

Said one or more sensors configured to provide sensor data for providing basis for controlling the one or more fixation devices may comprise one or more pressure sensors configured to detect pressure provided by said one or more fixation devices against the vehicle operator, i.e. body part/parts of aiming operator.

Said one or more sensors configured to provide sensor data for providing basis for controlling the one or more fixation devices may comprise one or more vehicle motion sensors configured to detect vehicle movement comprising vehicle vibrations.

According to an aspect of the present disclosure, the support device 40 may comprise or be operably connected to one or more sensors for determining size of the and/or vehicle vibration during vehicle movement and/or desired degree of fixation, and/or provided pressure against one or more body parts by means of said one or more fixation devices.

In FIG. 3, according to an exemplary aspect of the present disclosure, the fixation devices 44A, 44B, 44C, 44D are provided with pressure sensors 112, 114, 116, 118 for detecting the pressure provided by said fixation devices 44A, 44B, 44C, 44D against body parts of the vehicle operator.

According to an aspect of the present disclosure the control device 100 is configured to control the one or more fixation devices 44A, 44B, 44C, 44D by means of said activation unit 80.

Figure 4:
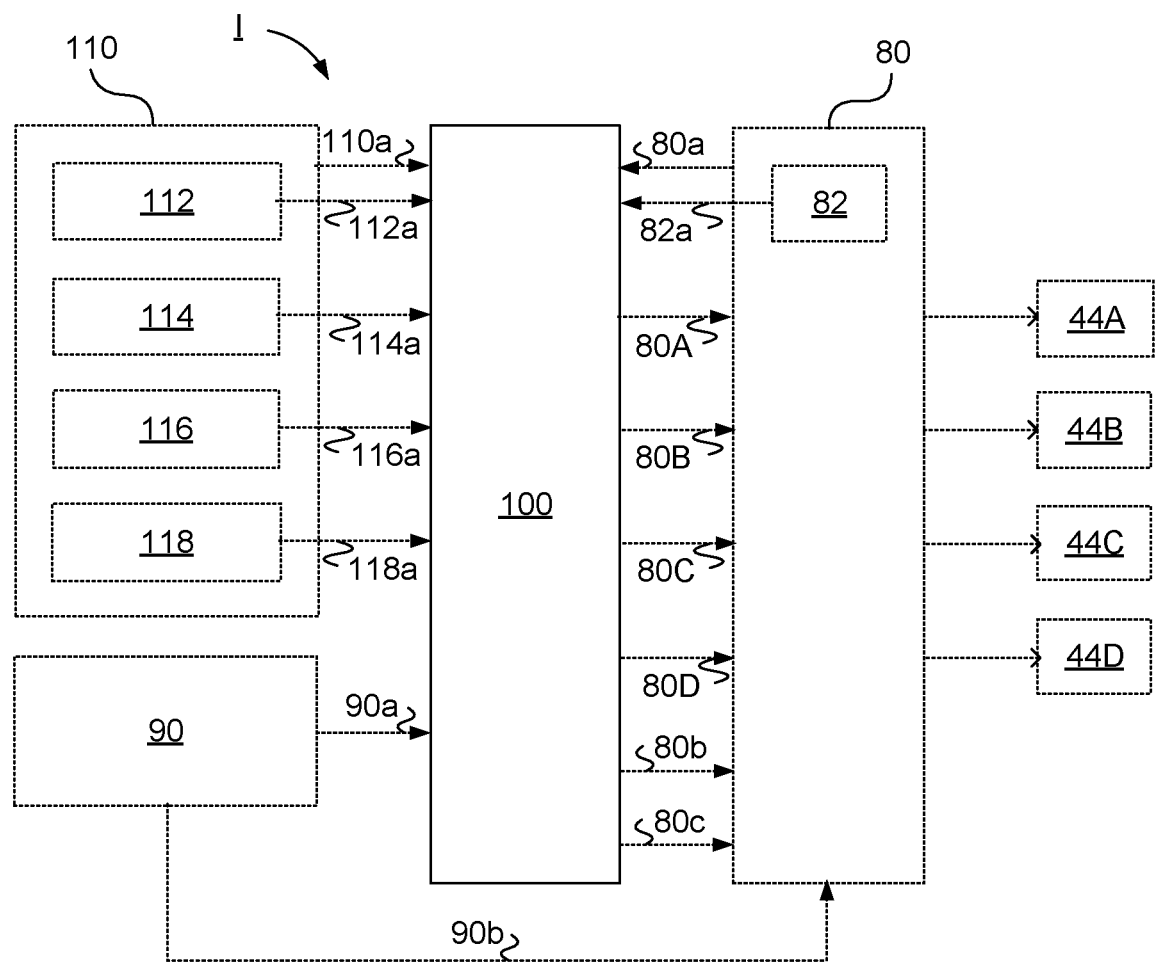

FIG. 4 schematically illustrates a front view of a system I for controlling adjustment of one or more fixation devices of a support device of an aiming operation arrangement according to an embodiment of the present disclosure.

The system I comprises a control device 100 for controlling the fixation of one or more fixation devices of a support device of an aiming operation arrangement. The one or more fixation devices may be any suitable fixation devices such as fixation devices 44A, 44B, 44C, 44D described with reference to FIGS. 2 and 3. The fixation devices 44A, 44B, 44C, 44D may be any suitable fixation device, and may comprise a first fixation device 44A, a second fixation device 44B, a third fixation device 44C and a fourth fixation device 44D. The support device of an aiming operation arrangement may be any suitable support device such as a support device 40 with reference to FIGS. 2 and 3.

The aiming operation arrangement according to the present disclosure may comprise a system I for controlling adjustment of one or more fixation devices of a support device.

The control device 100 may be implemented as a separate entity or distributed in two or more physical entities. The control device 100 may comprise one or more computers. The control device 100 may thus be implemented or realised by the control device comprising a processor and a memory, the memory comprising instructions, which when executed by the processor causes the control device to perform the herein disclosed method.

The control device 100 may comprise one or more electronic control units, processing units, computers, server units or the like for controlling adjustment of one or more fixation device of a support device of an aiming operation arrangement. The control device 100 may comprise control device such as one or more electronic control units arranged on board the military vehicle.

According to an aspect of the present disclosure, the system I comprises an activation unit 80 for activating one or more fixation devices for providing fixation of one or more body parts of a vehicle operator so as to reduce influence of vehicle movement during aiming operation.

According to an aspect of the present disclosure, the control device 100 may, via a link 80a, be operably connected to the activation unit 80. According to an aspect of the present disclosure, the control device 100 may via the link 80a be arranged to receive one or more signals from the activation unit 80 representing data about activation of said one or more fixation devices.

The activation unit 80 may be comprised in or be operably connectable to the control device 100. The activation unit 80 may comprise a manually operable manoeuvring device 82 for a vehicle operator to activate said one or more fixation devices.

According to an aspect of the present disclosure, the control device 100 may, via a link 82a, be operably connected to the manually operable manoeuvring device 82. According to an aspect of the present disclosure, the control device 100 may via the link 82a be arranged to receive one or more signals from the manually operable manoeuvring device 82 representing data about activation of said one or more fixation devices.

According to an aspect of the present disclosure, the control device 100 may be configured to determine size of the vehicle operator and/or vehicle vibration during vehicle movement and/or provided pressure against one or more body parts by means of said one or more fixation devices.

According to an aspect of the present disclosure, the system I comprises a sensor arrangement 110 for determining size of the vehicle operator and/or vehicle vibration during vehicle movement and/or desired degree of fixation, and/or provided pressure against one or more body parts by means of said one or more fixation devices.

The sensor arrangement 110 may be comprised in and/or operably connected to the control device 100.

According to an aspect of the present disclosure, the control device 100 may, via a link 110a, be operably connected to the sensor arrangement 110. According to an aspect of the present disclosure, the control device 100 may via the link 110a be arranged to receive one or more signals from the sensor arrangement 110 representing data about size of the vehicle operator and/or data about vehicle vibration during vehicle movement and/or data about provided pressure against one or more body parts by means of said one or more fixation devices.

According to an aspect of the present disclosure, the sensor arrangement 110 comprises a first sensor unit 112 configured to determine pressure provided by the first fixation device 44A. According to an aspect of the present disclosure, the control device 100 may, via a link 112a, be operably connected to the first sensor unit 112. According to an aspect of the present disclosure, the control device 100 may via the link 112a be arranged to receive one or more signals from the first sensor unit 112 representing data about pressure provided by the fourth first device 44A on body part of aiming operator.

According to an aspect of the present disclosure, the sensor arrangement 110 comprises a second sensor unit 114 configured to determine pressure provided by the second fixation device 44B. According to an aspect of the present disclosure, the control device 100 may, via a link 114a, be operably connected to the second sensor unit 114. According to an aspect of the present disclosure, the control device 100 may via the link 114a be arranged to receive one or more signals from the second sensor unit 114 representing data about pressure provided by the second fixation device 44B on body part of aiming operator.

According to an aspect of the present disclosure, the sensor arrangement 110 comprises a third sensor unit 116 configured to determine pressure provided by the third fixation device 44C. According to an aspect of the present disclosure, the control device 100 may, via a link 116a, be operably connected to the third sensor unit 116. According to an aspect of the present disclosure, the control device 100 may via the link 116a be arranged to receive one or more signals from the third sensor unit 116 representing data about pressure provided by the third fixation device 44C on body part of aiming operator.

According to an aspect of the present disclosure, the sensor arrangement 110 comprises a fourth sensor unit 118 configured to determine pressure provided by the fourth fixation device 44D. According to an aspect of the present disclosure, the control device 100 may, via a link 118a, be operably connected to the fourth sensor unit 118. According to an aspect of the present disclosure, the control device 100 may via the link 118a be arranged to receive one or more signals from the fourth sensor unit 118 representing data about pressure provided by the fourth fixation device 44D on body part of aiming operator.

According to an aspect of the present disclosure, the control device 100 may, via a link 80b, be operably connected to the activation unit 80. According to an aspect of the present disclosure, the control device 100 may via the link 80b be arranged to send one or more signals to the activation unit 80 representing data about degree of activation of said one or more fixation devices based on sensor information from the sensor arrangement 110.

According to an aspect of the present disclosure, the control device 100 may, via a link 80A, be operably connected to the activation unit 80. According to an aspect of the present disclosure, the control device 100 may via the link 80A be arranged to send one or more signals to the activation unit 80 representing data about degree of activation of said first fixation device based on sensor information from the first sensor unit 112.

According to an aspect of the present disclosure, the control device 100 may, via a link 80B, be operably connected to the activation unit 80. According to an aspect of the present disclosure, the control device 100 may via the link 80B be arranged to send one or more signals to the activation unit 80 representing data about degree of activation of said second fixation device based on sensor information from the second sensor unit 114.

According to an aspect of the present disclosure, the control device 100 may, via a link 80C, be operably connected to the activation unit 80. According to an aspect of the present disclosure, the control device 100 may via the link 80C be arranged to send one or more signals to the activation unit 80 representing data about degree of activation of said third fixation device based on sensor information from the third sensor unit 116.

According to an aspect of the present disclosure, the control device 100 may, via a link 80D, be operably connected to the activation unit 80. According to an aspect of the present disclosure, the control device 100 may via the link 80D be arranged to send one or more signals to the activation unit 80 representing data about degree of activation of said fourth fixation device based on sensor information from the fourth sensor unit 118.

According to an aspect of the present disclosure, the control device 100 may be configured to determine emergency deactivation situation involving required deactivation of said one or more fixation devices to a non-fixated state.

According to an aspect of the present disclosure, the system I comprises a emergency deactivation unit 90 for deactivating said one or more fixation devices to said non-fixated state.

According to an aspect of the present disclosure, the control device 100 may, via a link 90a, be operably connected to the emergency deactivation unit 90. According to an aspect of the present disclosure, the control device 100 may via the link 90a be arranged to receive one or more signals from the emergency deactivation unit 90 representing data about situation requiring deactivation of said one or more fixation devices.

According to an aspect of the present disclosure, the control device 100 may, via a link 80c, be operably connected to the activation unit 80. According to an aspect of the present disclosure, the control device 100 may via the link 80c be arranged to send one or more signals to the activation unit 80 representing data about deactivation of said one or more fixation devices based on information from the emergency deactivation unit 90.

The emergency deactivation unit 90 may according to an aspect of the present disclosure be operably connected to the activation unit 80 via a link 90b.

According to an aspect of the present disclosure, the emergency deactivation unit 90 may via the link 90b be arranged to send one or more signals to the activation unit 80 representing data about deactivation of said one or more fixation devices.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications suited to the particular use contemplated.

The invention claimed is:

1. A military vehicle, said military vehicle comprising an aiming device and an aiming operation arrangement for a vehicle operator to operate the aiming device, said aiming operation arrangement comprising a support device for providing support for the operator when operating the aiming device, wherein the support device comprises one or more fixation devices operable between a non-fixated state and fixated state, said one or more fixation devices being configured to, in the fixated state, provide fixation of one or more body parts of the vehicle operator so as to reduce influence of vehicle movement during aiming operation, wherein at least one of said one or more fixation devices is inflatable and the support device comprises a control device for controlling fixation of said one or more fixation devices and the control device is configured to control fixation of said one or more fixation devices based on at least sensor data from one or more sensors configured to provide sensor data about vehicle vibration during vehicle movement, wherein at least one of the one or more fixation devices provides a different degree of inflation relative to at least one of the other fixation devices to provide differing degrees of fixation of the one or more body parts of the vehicle operator, the support device further comprises an activation unit configured to activate said one or more fixation devices to said fixated state depending on a type of aiming operation.

2. The military vehicle according to claim 1, said aiming operation arrangement further comprising a sight unit for aiming operation, wherein said one or more fixation devices are configured to, in the fixated state, provide fixation of one or more body parts of the vehicle operator so as to facilitate fixation of the vehicle operator relative to the sight unit during aiming operation.

3. The military vehicle according to claim 1, wherein said one or more fixation devices are configured to provide fixation of body parts of the vehicle operator comprising one or more of thighs, hip side, back, lower back, neck, head, forehead, shoulders, abs, lats, calves, chest, lateral chest, upper arms, lower arms, wrists.

4. The military vehicle according to claim 1, wherein said support device comprises a seat configuration, wherein at least one of said one or more fixation devices are arranged in connection to said seat configuration.

5. The military vehicle according to claim 1, wherein at least one of said one or more fixation devices is an expandable fixation device operable between a non-expanded state and an expanded state, said one or more expandable fixation devices being configured to, in the expanded state, provide fixation of one or more body parts of the vehicle operator.

6. The military vehicle according to claim 1, wherein at least one of said one or more fixation devices is adjustable so as to adapt the fixation to the size of the vehicle operator positioned in the support device.

7. The military vehicle according to claim 1, wherein at least one of said one or more fixation devices are configured to, in the fixated state, provide pressure against one or more body parts of the vehicle operator so as to achieve said fixation.

8. The military vehicle according to claim 1, wherein said activation unit comprises a manually operable maneuvering device.

9. The military vehicle according to claim 1, wherein said activation unit is configured to activate one or more fixation devices by providing a fluid for inflating the one or more fixation devices.

10. The military vehicle according to claim 1, wherein the support device comprises an emergency deactivation unit for deactivating said one or more fixation devices to said non-fixated state.

11. The military vehicle according to claim 1, wherein the activation unit is configured to activate different fixation devices to provide fixation of different body parts of the vehicle operator depending on the type of aiming operation.

12. The military vehicle according to claim 11, wherein the aiming operation types comprise camera operation, sight operation, weapon operation, surveillance operation, radar operation, remote weapon station operation, periscope operation, and observation operation.

* * * * *